June 10, 1969　　　L. G. HORWITT　　　3,448,779
PORTABLE TIRE INFLATOR
Filed June 20, 1967
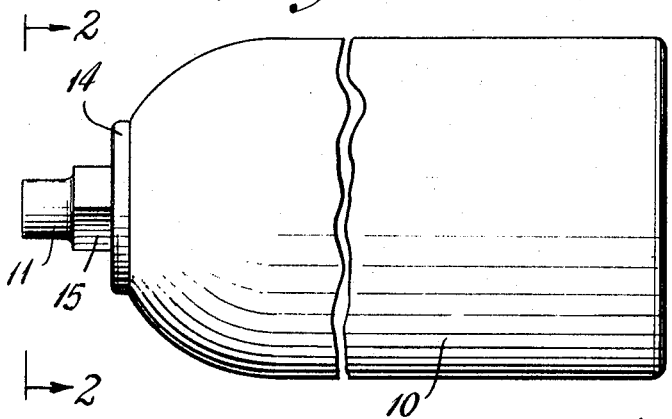
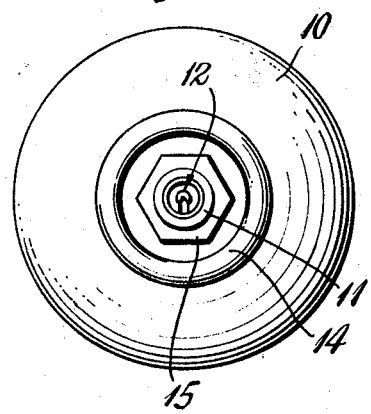
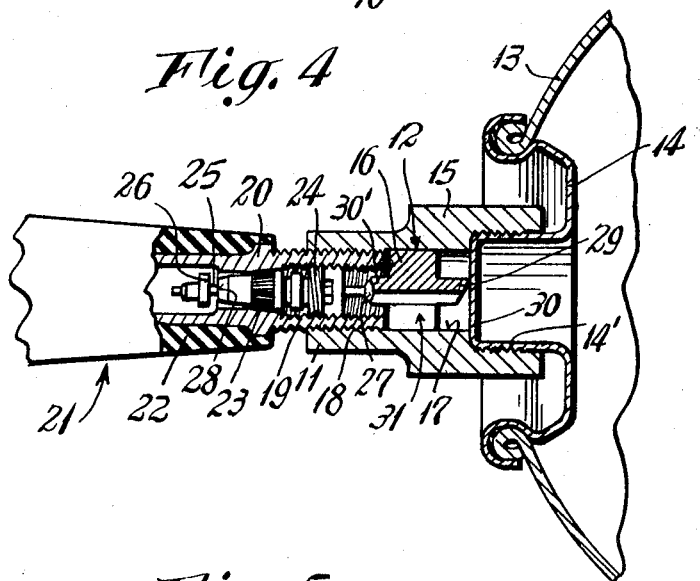
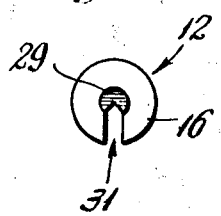
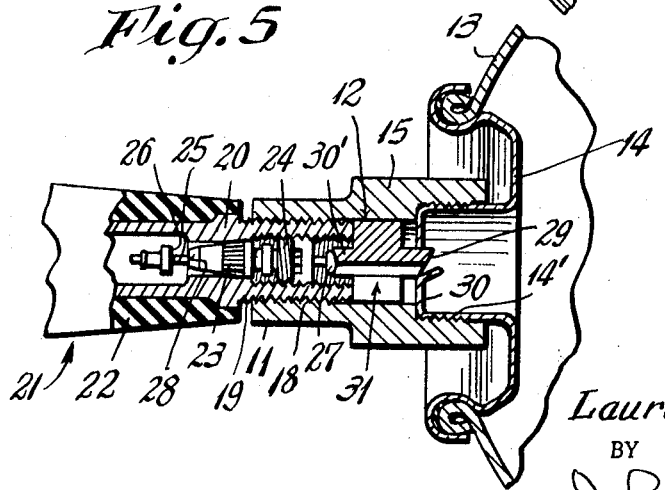
INVENTOR.
Laurence G. Horwitt
BY
Johnson and Kline
ATTORNEYS

United States Patent Office 3,448,779
Patented June 10, 1969

3,448,779
PORTABLE TIRE INFLATOR
Laurence G. Horwitt, New Haven, Conn., assignor to Casco Products Corporation, Bridgeport, Conn., a corporation of Connecticut
Filed June 20, 1967, Ser. No. 647,386
Int. Cl. B65b *31/08;* B60c *23/00*
U.S. Cl. 141—38                                                  5 Claims

ABSTRACT OF THE DISCLOSURE

A portable disposable tire inflator having a pressurized gas tank which is perforatable by engagement of the inflator with a tire valve to cause release of the pressurized gas and inflation of the tire, the inflator having a slidably mounted perforating means which is gas transmissive and which engages both the tire valve tube and its valve stem to open the tire valve and subsequently perforate the pressurized gas chamber.

---

This invention relates to a portable inflator for a single use in the inflation of a tire having a conventional Schrader-type valve core within a threaded valve tube. The invention is particularly concerned with pressurized perforatable inflators adapted for gastight connection to valves of the so-called Schrader type, for instance, for automatic perforation of the inflator tank and inflation of the tire.

Portable tire inflators have been heretofore proposed. Such inflators have a pressurized gas tank which is perforatable in some way by a perforating means upon engagement of the inflator with the tire valve. These proposed inflators have disadvantages which render them unreliable and unsatisfactory and dangerous in some instances.

According to one known proposal, the depressible valve stem within the valve tube functions to force the perforator through the wall of the pressurized gas chamber. Since a tire valve stem is necessarily delicate because of its small size, it may be easily damaged in performing this unintended operation and the damage thereto may cause the valve to leak when the inflator is removed.

In another known proposal, the perforator of the inflator is actuated by engaging the valve tube, but there is no means present to depress the valve stem and permit free entry of the gas to the tire. This places a severe limitation on the amount of gas that can be forced into the tire, because the valve is spring-pressed to closed position when and the pressure in the tire and the force of the spring exceed the pressure of the gas in the tank, the valve is forced into closed position and prevents inflation of the tire to the extent to which the gas in the tank is capable, there being no positive means present to hold the valve open.

It is the primary object of the present invention to provide a portable tire inflator of the portable and disposable type which is reliable and safe and which can be used without any fear of damage to the valve tube or its stem and which is capable of inflating a tire to the required pressure.

An advantageous feature of this invention is the provision of means whereby the inflator is capable of rapid and substantially complete discharge of the contents into the tire in a matter of seconds.

The tire inflator of the present invention is particularly advantageous when used to inflate so-called collapsible tires usually carried as spares, and which, in collapsible condition, contain very little air. With the inflator of the present invention, it is possible to inflate such a tire with a single tank of relatively small capacity and easily stored in the vehicle and handled in use.

Other objects and advantages of this invention will be clear to those skilled in the art in the light of the present disclosure including the drawings, in which:

FIGURE 1 is a fragmentary side view of an inflator according to this invention;

FIG. 2 is a top view of the inflator taken on the line 2—2 of FIG. 1;

FIG. 3 is an enlarged view of the perforator shown in FIG. 2;

FIG. 4 is a longitudinal section of portions of the inflator in engagement with a portion of the tire valve, showing the valve stem in open position prior to perforation of the gas tank; and FIG. 5 is like FIG. 4 but showing the inflator screwed further onto the tire valve tube to cause the gas tank to be perforated.

According to this invention there is provided a novel connecting and perforating means for a tire inflator which performs the four-fold function of attaching the inflator to the tank, depressing the stem of the valve sufficiently to open the valve without placing undue strain thereon, engaging the valve tube to cause the perforator to pierce the gas tank, and transmitting the released gas to the tire to be inflated.

As illustrated by FIGS. 1 and 2, the tire inflator of the present invention comprises a pressurized gas container or tank 10 having one end thereof, a connector sleeve 11 for connection to the valve and having slidably mounted therein a perforator 12.

In the embodiment illustrated the inflator has only four parts: the gas tank 10 having a body section 13; a cap 14 sealed onto one end of the body 13; a sleeve 15 which is adapted to be threaded onto a projecting neck 14' of the cap; and the perforator 12.

The perforator 12, shown in detail in FIGS. 3 to 5, has a cylindrical portion 16 in sliding engagement with the inner unthreaded portion 17 of the sleeve 15.

The connector sleeve 15 at its outer end has an internally threaded portion 18 which is adapted to fit and be threaded on the usual external threads 19 of the tube 20 of a tire valve 21 as shown in FIGS. 4 and 5.

The tire valve 21 shown in FIGS. 2, 4 and 5, by way of example, is of the type used on a tubeless tire. It has a base portion (not shown) attached to the tire and a body portion 22, usually made of rubber, in which is embedded the tube 20.

The valve shown, again by way of example, is of the Schrader type and has an internal valve unit comprising a tube 23 having a threaded portion 24 which is screwed into the internally threaded projecting portion 18 of the tube, and a valve stem 25, one end of which has a valve 26 and the other end of which projects from the threaded body 24 and has a head 27. A spring (not shown) normally holds the valve 26 on the valve seat 28.

The perforator 12 has a projection 29 which is pointed and normally positioned, as shown in FIG. 4, against or close to the wall 30 of the neck 16 of the cap 14. The perforator 12 is, in the form shown, retained in the sleeve 15 by a shoulder formed at the inner end of the threaded portion 18.

The perforator 12 also has a central axially projecting stud 30' small enough to fit in the bore of the tube 20. The perforator has a passage 31 permitting gas to flow through it. The passage 31 is preferably a V-shape slot extending through the pointed end 29 of the perforator because it provides a sufficiently large passage without reducing the piercing effect of the pointed end.

When a tire is to be inflated, the tank 10 is rotated to cause the sleeve 15 to be screwed onto the threaded tube 20 of the tire valve. When the connection is established to the extent shown in FIG. 4, the outer end of the tube 20 is about to engage the adjacent surface of the perforator 12.

Before this occurs, the stud 30' on the perforator engages the head 27 of the valve stem 25 and forces it inwardly to move the valve 26 off the valve seat 28. However, this operation would not permit air under pressure in the tire, if any there be, to escape because this is prevented by the closed end 31 of the cap 14.

As the tank 10 and connector sleeve 15 are rotated further, the end of the valve tube 20 will engage the perforator and force the pointed projection 29 of the perforator into the end wall 30 to perforate it, as shown in FIG. 5, and allow the gas in the tank to flow through the perforator, the valve tube 20 and valve body to the tire without being in the slightest interfered with by the valve 26.

The movement of the parts from the FIG. 4 positions to those of FIG. 5 forces the valve 26 farther from the valve seat, but this additional movement against the force of the valve spring has no undesirable effects on the valve stem.

After the tire is inflated, the tank and connector sleeve are removed from the tire valve by reverse rotation during which the valve tube 20 remains in communication with the interior of the tank until the stud 30' on the perforator disengages the head 27 of the valve stem and allows the valve 26 to reengage the valve seat under the force of the valve spring.

To avoid the possibility of the tank separating from the connector sleeve 15 in the removal operation, which would leave the latter on the valve tube where the valve 26 would remain open and allow gas to escape from the tire, the sleeve 15 is preferably permanently cemented to the neck 14' of the cap.

It will be appreciated that the essential feature of the combined connector and perforator of this invention is that the perforator be capable of depressing the valve stem and opening the tire valve prior to the engagement of the end of the valve tube with the perforator so that the force required to perforate the tank is supplied by the valve tube and not by the valve stem.

It should be noted that when the tank is removed from the valve sleeve, any gas remaining in the tank is free to flow to the atmosphere through the punctured hole in the can, the passage 31, and the coupling sleeve 15. The tank, not being pressurized, can be disposed of safely.

Variations and modifications may be made within the scope of the claims and portions of the improvements may be used without others.

I claim:

1. A tire inflator comprising a pressurized gas tank, a connector sleeve attached to the tank to rotate therewtih and having screw-thread means for attaching the tank to the threaded end of the tube of a tire valve, a perforator in the sleeve having oppositely disposed means for opening the valve of the tire valve and means for perforating the tank, said last-named means being shaped and positioned when the connector is screwed onto the tire valve for engagement with the end of the tube to be moved to pierce the tank so that the gas can pass through the sleeve from the tank to the tire, and said means for opening the valve of said tire valve being shaped and positioned to enter the valve tube and move to engage and open the valve before and independently of the engagement of the perforating means with the end of the valve tube when the connector is screwed by rotation with the tank onto the tire valve.

2. A tire inflator according to claim 1 in which the position of the perforator is such that when the connector sleeve and the tank are screwed off the tire valve, said means for opening the valve becomes inoperative to keep the valve open before the connector becomes disconnected from the tire valve.

3. A tire inflator according to claim 1 in which the tank has a cap with a threaded neck and the connector sleeve is threaded to be screwed onto the neck, and there are means for preventing the sleeve from inadvertently being screwed off the neck when removing the sleeve and tank from the valve tube.

4. An inflator according to claim 1 in which the said means for performing the tank has a radial slot through which gas from the tank may pass.

5. A tire inflator comprising a pressurized gas tank; a connector sleeve thereon having a cylindrical threaded interior surface adapted to receive and threadably engage the threaded exterior of a valve tube on a tire valve; a perforator which is transmissive of gas slidably mounted in said sleeve and comprising a body section engaging the interior of said connector sleeve and of sufficient diameter to engage the outer end of a valve tube into which the sleeve is screwed; and a perforating projection extending from said body section and adapted to perforate said tank when the perforator is forced by the valve tube into engagement with the tank, said perforator having a stud projecting from the surface of said perforator body opposite to said perforator projection and adapted to fit within the valve tube and engage and depress a tire valve stem sufficiently to open the valve before the valve tube is in engagement with the perforator body and prior to perforation of the tank, the engagement between the perforator body and the valve tube preventing the stud from exerting excess pressure against the valve stem, the force applied to open the tire valve being independent of the force applied to pierce the tank.

References Cited

UNITED STATES PATENTS

| 2,336,708 | 12/1943 | Ward | 141—17 X |
| 2,575,908 | 11/1951 | Clifford | 152—415 |
| 2,849,156 | 8/1958 | Mansted | 222—83 |
| 2,857,901 | 10/1958 | Neely | 141—330 X |
| 2,865,410 | 12/1958 | Neely | 141—349 X |
| 2,919,833 | 1/1960 | Wolshin | 9—318 X |
| 3,329,180 | 7/1967 | Van Brocklin | 141—349 |

HOUSTON S. BELL, JR., *Primary Examiner.*

U.S. Cl. X.R.

152—415, 384, 349, 329; 141—98, 318; 137—223